(12) United States Patent
Gramlich et al.

(10) Patent No.: US 11,990,248 B2
(45) Date of Patent: May 21, 2024

(54) ROBUST NUCLEAR PROPULSION FISSION REACTOR WITH TRI-PITCH PATTERNED CORE AND DRUM ABSORBERS

(71) Applicant: BWXT Advanced Technologies LLC, Lynchburg, VA (US)

(72) Inventors: Craig D. Gramlich, Forest, VA (US); Benjamin D. Fisher, Lynchburg, VA (US); William E. Russell, II, Lynchburg, VA (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 468 days.

(21) Appl. No.: 16/999,244

(22) Filed: Aug. 21, 2020

(65) Prior Publication Data

US 2021/0304909 A1    Sep. 30, 2021

Related U.S. Application Data

(60) Provisional application No. 62/893,263, filed on Aug. 29, 2019.

(51) Int. Cl.
*B64G 1/40* (2006.01)
*G21C 3/04* (2006.01)
(Continued)

(52) U.S. Cl.
CPC .............. *G21C 17/102* (2013.01); *G21C 3/04* (2013.01); *G21C 19/30* (2013.01); *B64G 1/408* (2013.01); *B64G 1/422* (2013.01)

(58) Field of Classification Search
CPC ......... G21C 17/102; G21C 3/04; G21C 19/30
See application file for complete search history.

(56) References Cited

U.S. PATENT DOCUMENTS 3,128,234 A * 4/1964 Cage, Jr. .................. G21C 1/16
376/427
3,141,383 A * 7/1964 Abild ....................... G21C 7/16
137/487

(Continued)

FOREIGN PATENT DOCUMENTS

CN     103258576 A  *  8/2013
CN     110189836 A  *  8/2019  ............... G21C 7/14
(Continued)

OTHER PUBLICATIONS

International Search Report/Written Opinion dated May 4, 2021 in PCT/US20/47722.
(Continued)

*Primary Examiner* — Lily C Garner
(74) *Attorney, Agent, or Firm* — Morgan, Lewis & Bockius LLP

(57) ABSTRACT

Nuclear propulsion fission reactor structure has an active core region including fuel element structures, a reflector with rotatable neutron absorber structures (such as drum absorbers), and a core former conformal mating the outer surface of the fuel element structures to the reflector. Fuel element structures are arranged abutting nearest neighbor fuel element structures in a tri-pitch design. Cladding bodies defining coolant channels are inserted into and joined to upper and lower core plates to from a continuous structure that is a first portion of the containment structure. The nuclear propulsion fission reactor structure can be incorporated into a nuclear thermal propulsion engine for propulsion applications, such as space propulsion.

37 Claims, 11 Drawing Sheets

(51) Int. Cl.
*G21C 17/10* (2006.01)
*G21C 19/30* (2006.01)
*B64G 1/42* (2006.01)

(56) References Cited

U.S. PATENT DOCUMENTS

| | | | | |
|---|---|---|---|---|
| 3,149,043 | A * | 9/1964 | Joseph | G21C 3/30 |
| | | | | 376/334 |
| 3,161,014 | A * | 12/1964 | Abild | G21C 7/14 |
| | | | | 192/93 R |
| 3,164,525 | A * | 1/1965 | Dieckamp | G21C 1/24 |
| | | | | 976/DIG. 114 |
| 3,296,083 | A * | 1/1967 | Haake | G21C 15/02 |
| | | | | 376/373 |
| 3,820,325 | A | 6/1974 | Roman | |
| 4,113,563 | A * | 9/1978 | Tobin | G21C 1/12 |
| | | | | 376/427 |
| 4,609,522 | A | 2/1986 | Davidson et al. | |
| 5,087,412 | A * | 2/1992 | Bingham | G21C 15/02 |
| | | | | 976/DIG. 188 |
| 5,289,512 | A * | 2/1994 | Pettus | G21D 5/02 |
| | | | | 376/397 |
| 5,410,578 | A * | 4/1995 | Walton | G21C 3/20 |
| | | | | 376/427 |
| 5,475,722 | A * | 12/1995 | Culver | G21D 5/02 |
| | | | | 376/386 |
| 5,724,398 | A * | 3/1998 | Burrow | G21C 3/33 |
| | | | | 376/427 |
| 5,873,239 | A * | 2/1999 | Culver | G21D 5/02 |
| | | | | 376/318 |
| 9,180,985 | B1 | 11/2015 | Hardy et al. | |
| 9,236,150 | B2 * | 1/2016 | Ahlfeld | G21C 1/024 |
| 10,068,675 | B1 * | 9/2018 | Raj | B64G 1/408 |
| 10,643,754 | B2 | 5/2020 | Venneri | G21C 15/08 |
| 11,139,086 | B2 * | 10/2021 | Howe | G21C 5/18 |
| 11,424,041 | B2 * | 8/2022 | Fisher | G21C 3/048 |
| 2010/0172460 | A1 * | 7/2010 | Yoon | G21C 3/322 |
| | | | | 376/438 |
| 2010/0316177 | A1 * | 12/2010 | Stambaugh | G21C 9/02 |
| | | | | 376/229 |
| 2015/0228363 | A1 * | 8/2015 | Dewan | G21C 1/22 |
| | | | | 376/458 |
| 2015/0357056 | A1 * | 12/2015 | Shayer | G21C 7/28 |
| | | | | 376/220 |
| 2017/0213610 | A1 | 7/2017 | Sumita et al. | |
| 2017/0249999 | A1 | 8/2017 | DeWitte et al. | |
| 2017/0263345 | A1 * | 9/2017 | Venneri | B64G 1/408 |
| 2018/0233238 | A1 * | 8/2018 | Hackett | C22C 27/025 |
| 2020/0373024 | A1 * | 11/2020 | Gramlich | G21C 15/04 |
| 2020/0373027 | A1 * | 11/2020 | Gramlich | G21C 5/06 |
| 2021/0304909 | A1 * | 9/2021 | Gramlich | G21C 19/30 |
| 2021/0375493 | A1 * | 12/2021 | Wolodzko | G21C 3/28 |
| 2022/0051821 | A1 * | 2/2022 | Bernauer | G21C 5/06 |
| 2022/0301732 | A1 * | 9/2022 | Venneri | B64D 27/22 |

FOREIGN PATENT DOCUMENTS

| | | | | |
|---|---|---|---|---|
| DE | 1090786 | B * | 10/1960 | |
| DE | 1935094 | U * | 3/1966 | |
| GB | 1126323 | A * | 9/1968 | |
| KR | 101482018 | B1 * | 1/2015 | |
| KR | 101487713 | | * 1/2015 | |
| WO | WO-2016197807 | A1 * | 12/2016 | G21C 1/00 |
| WO | 2019/126790 | A1 | 6/2019 | |
| WO | WO-2021067901 | A1 * | 4/2021 | B64D 27/22 |
| WO | WO-2021067903 | A1 * | 4/2021 | B64D 27/22 |
| WO | WO-2021151055 | A1 * | 7/2021 | G21C 5/02 |

OTHER PUBLICATIONS

El-Genk et al., "Transient Analysis and Startup Simulation of a Thermoionic Space Nuclear Reactor System", Nuclear Technology, vol. 105, No. 1, pp. 70-86, Jan. 1994, XP000441690.
Extended European Search Report dated Jul. 13, 2023, issued in corresponding European Patent Application No. 20875484.6.
Kardoulaki et al., "Synthesis, thermal conductivity, and hydrogen compatibility of a high melt point solid solution uranium carbide, (U0.2Zr0.8)C", Nuclear Materials and Energy 33 (2022) 101290.
Office Action dated Oct. 10, 2023, issued in corresponding Canadian Patent Application No. 3,149,582.

* cited by examiner

US 11,990,248 B2

ROBUST NUCLEAR PROPULSION FISSION REACTOR WITH TRI-PITCH PATTERNED CORE AND DRUM ABSORBERS

RELATED APPLICATION DATA

This application is based on and claims the benefit of priority of U.S. Provisional Application No. 62/893,263, filed Aug. 29, 2019, the entire contents of which are incorporated herein by reference.

TECHNICAL FIELD AND INDUSTRIAL APPLICABILITY

The present disclosure relates generally to nuclear fission reactors and structures related to nuclear fission reactors, in particular for propulsion. Such nuclear propulsion fission reactors have applications in various non-terrestrial applications, such as space and ocean environments.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Various propulsion systems for non-terrestrial applications, such as in space, have been developed. These include chemical-based propulsion systems, ion-based propulsion systems, and nuclear-based propulsion systems. Each of these propulsion systems balances thrust and specific impulse to provide performance that is tailored to specific missions. For example, chemical-based propulsion systems have high thrust (e.g., >$10^7$ lbs thrust (>$4.45 \times 10^7$ N)), but modest specific impulse (e.g., 450 sec) and are efficiently applied to heavy lift operations, such as placing payloads into earth orbit. Ion-based propulsion systems have low thrust (e.g., <10 lbs thrust (<44.5 N)), but high specific impulse (e.g., 1,000-9,000 sec) and are efficiently applied for long term space travel, such as inter-stellar travel. Nuclear-based propulsion systems combines modest thrust (e.g., 5,000-75,000 lbs thrust (22,250-333,750 N)) and modest specific impulse (e.g., 600-1,000 sec) and are efficiently applied to near-space travel. Nuclear-based propulsion systems are currently being evaluated as a propulsion option for NASA's Human Exploration of Mars Design Reference Architecture 5.0.

Previous nuclear-based propulsion systems are still complex. For example, both Nuclear Engine for Rocket Vehicle Application (NERVA) and Project Rover have developed nuclear thermal rocket designs. A typical design for a nuclear thermal propulsion reactor and engine 10 is shown in FIG. 1. The illustrated nuclear thermal propulsion reactor and engine 10 includes four main features: a hull 20 having a reactor 22 contained within a reflector 24, turbomachinery 30 including turbo pumps 32 and other piping and support equipment 34, shielding 40 separating the turbomachinery 30 from the hull 20, and a nozzle section 50 including a nozzle 52 and a nozzle skirt 54.

However, these prior nuclear-based propulsion systems still have drawbacks, including utilizing complex moderators and flow techniques, operating with minimal design margins that push the limits of the design and associated materials. Accordingly, there is still a need for robust and simple designs for nuclear propulsion reactors, particular for non-terrestrial applications, such as in space.

SUMMARY

Considering the above, it would be advantageous to have a robust, single pass propellant flow, nuclear-based propulsion system with a simplified core pattern for ease of manufacturing. Additionally, a simplified design with reduced number of weld points in manufacturing is advantageous to reduce the risk of performance degradation.

In general, the disclosure is directed to a nuclear fission reactor structure suitable for use as an engine in a nuclear-based propulsion system. In exemplary embodiments, the nuclear fission reactor structure utilizes a fuel element with a hexagonal cross-section arranged in a tri-pitch design and rotatable drum neutron absorbers for reactivity control. The nuclear fission reactor structure is housed in a hull of a nuclear thermal propulsion reactor and engine. A propulsion gas is used as a coolant for the nuclear fission reactor structure. Propulsion gas superheated in the nuclear fission reactor structure exits through a nozzle and generates thrust and impulse.

Embodiments disclosed herein include a nuclear propulsion fission reactor structure comprising an active core region including a plurality of fuel element structures and having an axial centerline defining a longitudinal axis of the nuclear propulsion reactor; a core former radially outward of the active core region; a reflector radially outward of the core reformer and having a radially inner surface oriented toward the active core region; and a plurality of neutron absorber structures located within a volume of the reflector. Each fuel element structure includes a cladding body having an inner surface defining a coolant channel, a fuel composition body radially outward of the cladding body, and a moderator composition body radially outward of the fuel composition body. Additionally, an outer surface of a moderator composition body of a first fuel element structure abuts an outer surface of a moderator composition body of a plurality of nearest neighbor fuel element structures. The core former has a first surface radially inward of a second surface and the first surface is conformal to a radially outer surface of the active core region and the second surface is conformal to the radially inner surface of the reflector. Each of the plurality of neutron absorber structures includes a neutron absorber body movable between a first position and a second position, the first position being radially closer to the active core region than the second position.

Embodiments disclosed herein also include a nuclear thermal propulsion engine comprising the nuclear propulsion fission reactor structure disclosed herein and a hull, wherein the active core region, the core former, the upper core plate, the lower core plate, the reflector, and the plurality of neutron absorber structures form a reactor structure, and the reactor structure is housed within an interior volume of the hull. In forming the nuclear thermal propulsion engine, shielding, a reservoir for cryogenically storing a propulsion gas, turbomachinery, and a nozzle, are operatively attached to the reactor structure is housed within an interior volume of the hull such that the upper core plate is oriented toward a first end of the hull and the lower core plate is oriented toward a second end of the hull; the shielding, turbomachinery, and the reservoir are operatively mounted to the first end of the hull to provide a flow path from the reservoir to the nuclear propulsion reactor; and the nozzle is operatively mounted to the second end of the hull to provide a flow path for superheated propulsion gas exiting the nuclear propulsion reactor.

Embodiments disclosed herein also include a method of fabricating a nuclear fission reactor structure. The method comprises joining a first portion of each of a plurality of cladding bodies to a lower core plate, wherein each cladding body has an inner surface defining a coolant channel, wherein the lower core plate includes a plurality of openings extending from a first side of the lower core plate to a second side of the lower core plate, and wherein the first portion of each cladding body extends into a different one of the plurality of openings in the lower core plate. Then, each of a plurality of fuel composition bodies are placed over an outer surface of a different one of the plurality of cladding bodies, such as by sliding, wherein each fuel composition body has the shape of an annular cylinder, and wherein an inner surface of the annular cylinder of the fuel composition body is oriented toward the outer surface of the cladding body. Each of the moderator bodies are then placed over an outer surface of a different one of a plurality of fuel composition bodies, such as by sliding, wherein, in a cross-section, each moderator body has a periphery having a regular polygonal shape and an inner opening, and wherein a surface of the inner opening of the moderator body is oriented toward an outer surface of the annular cylinder of the fuel composition body. Then, a second portion of the cladding body is joined to an upper core plate, wherein the upper core plate includes a plurality of openings extending from a first side of the upper core plate to a second side of the upper core plate and wherein the coolant channel of the cladding body extends into one of the plurality of openings in the upper core plate. The assembled cladding body, fuel composition body that is radially outward of the cladding body, and moderator composition body that is radially outward of the fuel composition body define a fuel element structure and, in each fuel element structure, the cladding body includes a first portion that extends axially past a first axial end of the fuel composition body and a second portion that extends axially past a second axial end of the fuel composition body. Also, an outer surface of a moderator body of a first fuel element structure abuts an outer surface of a moderator body of a plurality of nearest neighbor fuel element structures and a portion of the upper core plate, a portion of the lower core plate, and the cladding body of each fuel element structure form a first portion of a containment structure for the nuclear propulsion reactor.

BRIEF DESCRIPTION OF THE DRAWINGS

The foregoing summary, as well as the following detailed description of the embodiments, can be better understood when read in conjunction with the appended drawings. It should be understood that the embodiments depicted are not limited to the precise arrangements and instrumentalities shown.

Figure 1:
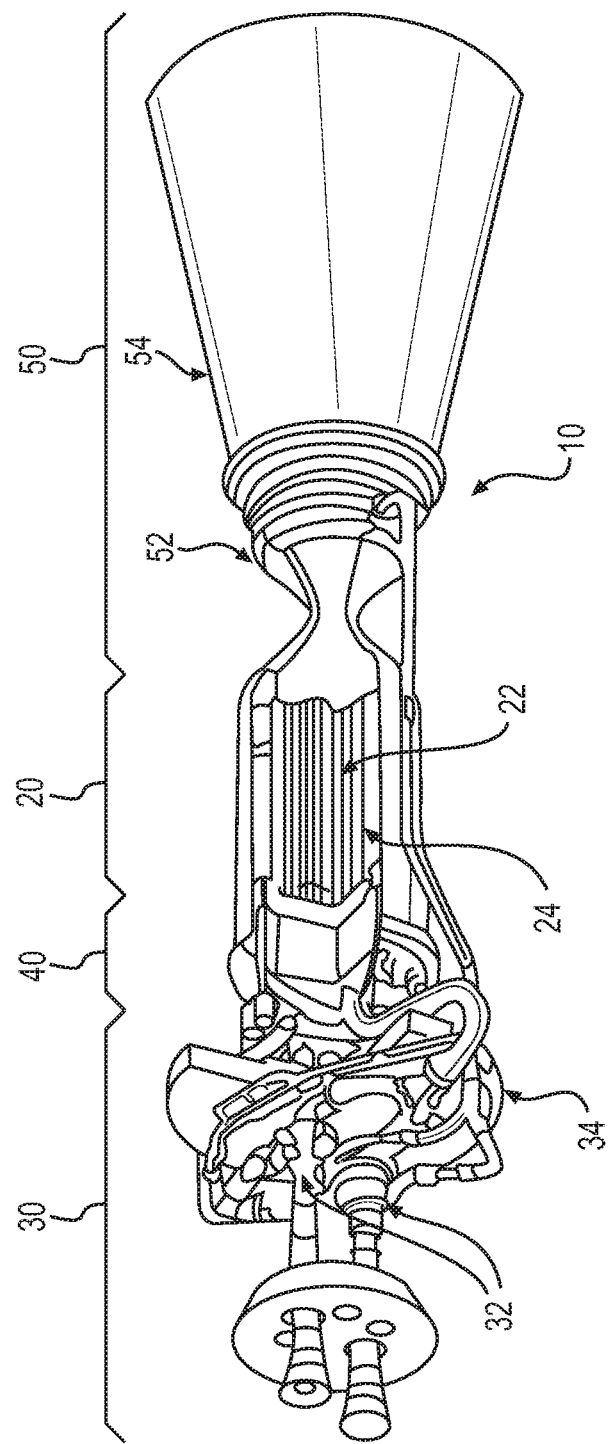
FIG. 1 illustrates structure and arrangement of features in a typical design for a nuclear thermal propulsion reactor and engine.

For ease of viewing, in some instances only some of the named features in the figures are labeled with reference numerals.

DETAILED DESCRIPTION

Figure 2:
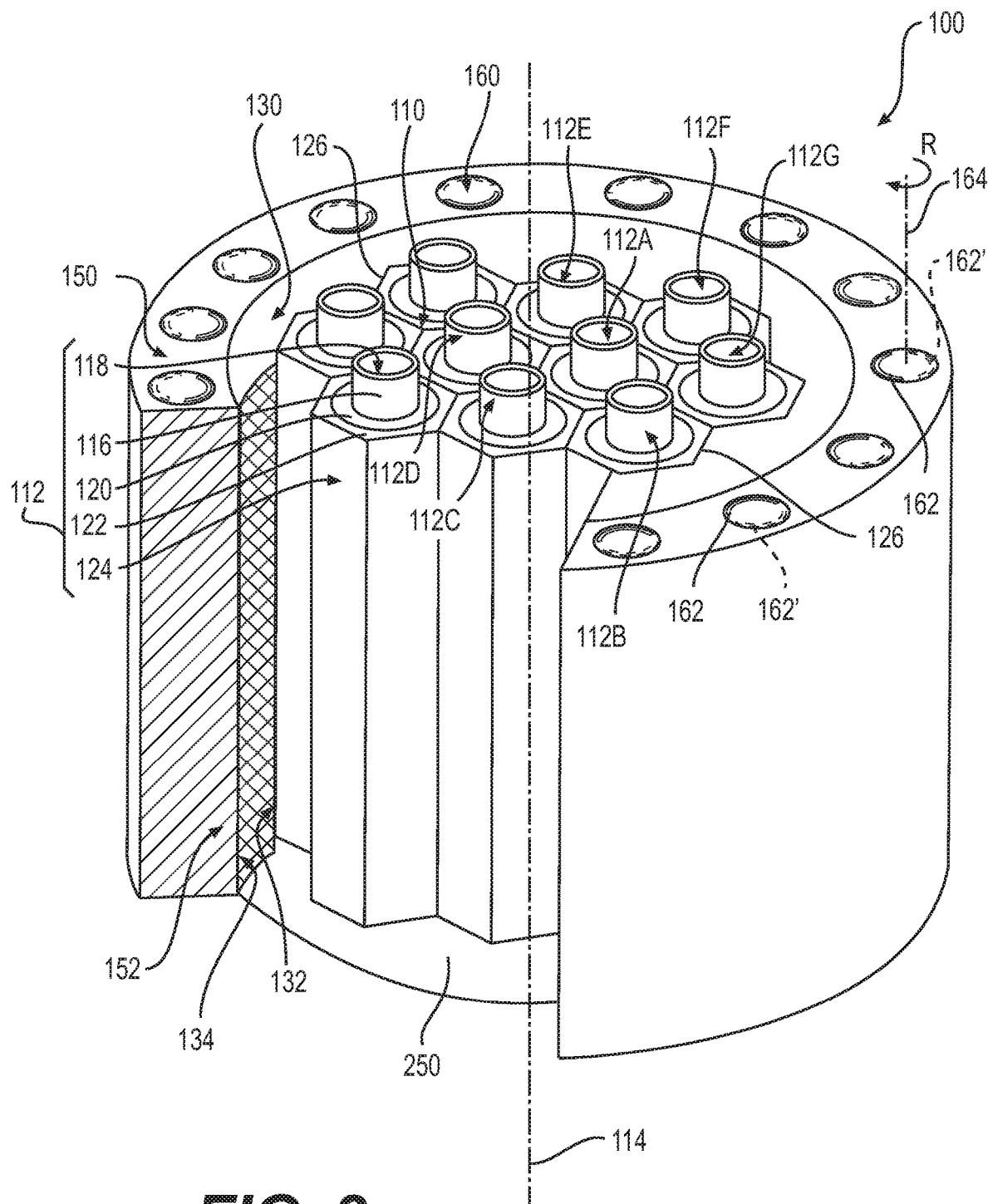
FIG. 2 schematically illustrates an embodiment of a nuclear propulsion fission reactor structure.

FIG. 2 schematically illustrates an embodiment of a nuclear propulsion fission reactor structure. The nuclear propulsion fission reactor structure 100 includes an active core region 110, a core former 130, a reflector 150, and a plurality of neutron absorber structures 160.

The active core region 110 includes a plurality of fuel element structures 112 and has an axial centerline defining a longitudinal axis 114 of the nuclear propulsion fission reactor structure 100. Each fuel element structure 112 includes a cladding body 116 having an inner surface 118 defining a coolant channel, a fuel composition body 120 radially outward of the cladding body 116, and a moderator composition body 122 radially outward of the fuel composition body 120. When the plurality of fuel element structures 112 are arranged within the active core region 110, an outer surface 124 of the moderator composition body 122 of a first fuel element structure 112 abuts an outer surface 124 of a moderator composition body 122 of a plurality of nearest neighbor fuel element structures 112. This has been illustrated in FIG. 2 for first fuel element structure 112a and plurality of nearest neighbor fuel element structures 112b-112g. For example, in exemplary embodiments, the side surfaces of the fuel element structures are in direct contact with side faces of adjacent fuel element structures. The collection of outer surfaces 124 of the moderator composition bodies 122 of the fuel element structures 112 that are at the periphery of the active core region 110 define the radially outer surface 126 of the active core region 110.

A core former 130 is radially outward of the active core region 110 and a reflector 150 is radially outward of the core former 130. A first surface 132 of the core former 130 is radially inward of a second surface 134 of the core former 130. The first surface 132 of the core former 130 is conformal to the radially outer surface 126 of the active core region 110 and the second surface 134 of the core former 130 is conformal to a radially inner surface 152 of the reflector 150. The radially inner surface 152 of the reflector 150 is oriented toward the active core region 110, and the core former 130 functions to mate the geometry of the radially outer surface 126 of the active core region 110 to the geometry of the radially inner surface 152 of the reflector 150.

A plurality of neutron absorber structures 160 is located within a volume of the reflector 150. The neutron absorber structures 160 include a neutron absorber body 162 movable, such as by rotation, between a first position and a second position, the first position being radially closer to the active core region than the second position. In exemplary embodiments, the first position is radially closest to the active core region and the second position is radially farthest from the active core region. In the embodiment shown in FIG. 2, the neutron absorber body 162 is shown in the first, radially closest position. For illustration, the second, radially distal position is shown using phantom lines (see second position illustrated as 162'). The neutron absorber body 162 is movable between the first position and the second position to control the reactivity of the active core region 110. In the illustrated example, the neutron absorber body 162 is rotatable from the first, radially closer position (corresponding to the location shown for neutron absorber body 162 in FIG. 2) to the second position 162' by rotation (R) around axis 164 of the neutron absorber structure 160. However, other radial positions and/or movement directions can be implemented as long as the various positions to which the neutron absorber body 162 can be moved provides control of the reactivity of the active core region 110. In some embodiments, when the plurality of neutron absorber bodies 162 are each at the first, radially closer position, each of the plurality of neutron absorber bodies 162 are radially equidistant from the axial centerline of the active core region 110.

Figure 3:
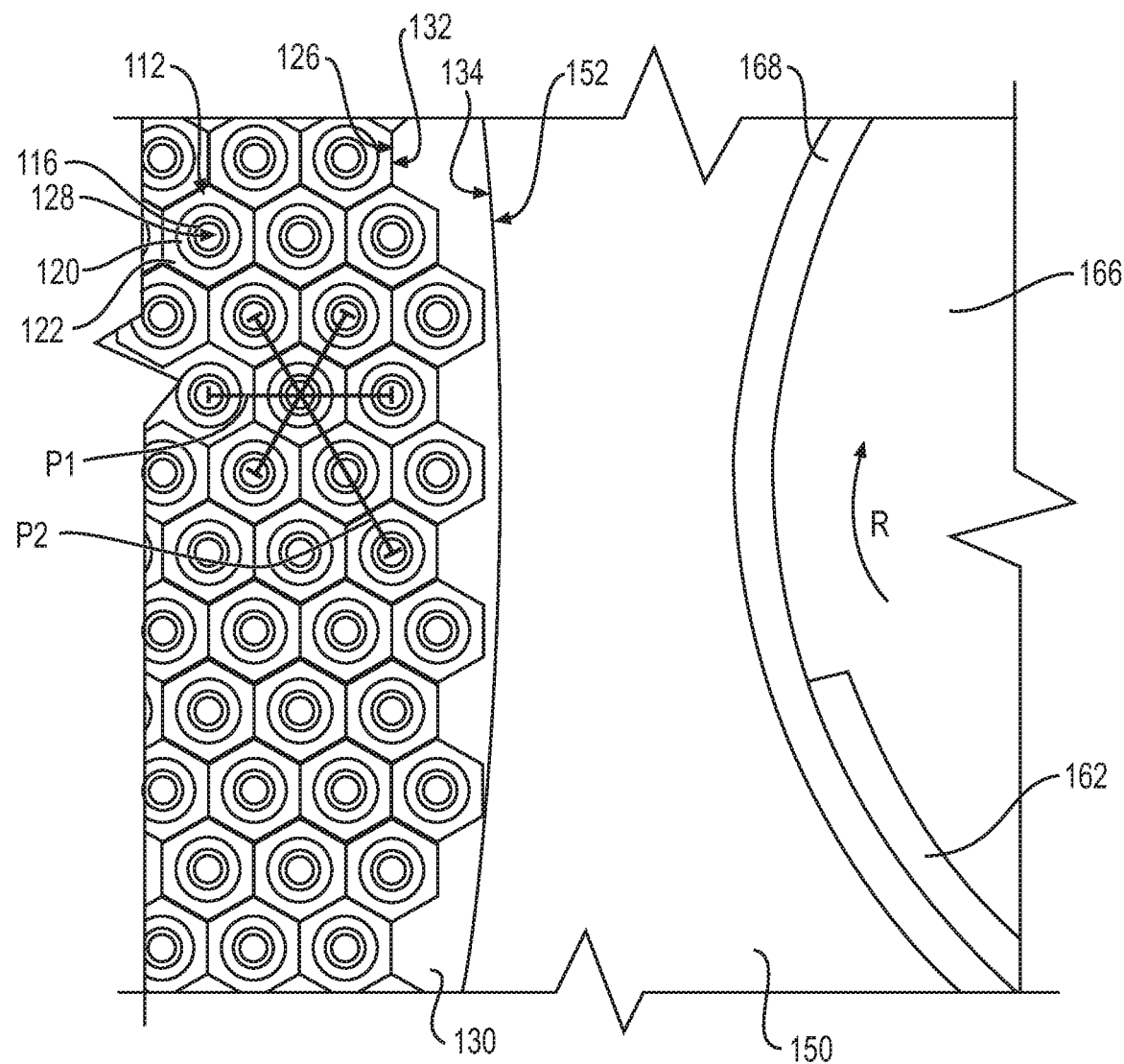
FIG. 3 is a partial, top side view of a portion of a nuclear propulsion fission reactor structure showing the mating between the active core region and the reflector.

FIG. 3 is a partial, top side view of a portion of a nuclear propulsion fission reactor structure. In FIG. 3, a portion of the active core region 110 is shown, as are the core former 130, the reflector 150, and a portion of neutron absorber body 162 in a neutron absorber structure 160. Several of the features already shown and described in connection with FIG. 2 are also shown in FIG. 3.

For example, FIG. 3 illustrates the plurality of fuel element structures 112 (arranged with a plurality of nearest neighbor fuel element structures) each with a cladding body 116, a coolant channel 128, a fuel composition body 120, and a moderator composition body 122. The plurality of fuel element structures 112 are collectively with translational symmetry. An example of translation symmetry is the tri-pitch design illustrated in FIG. 3. In the tri-pitch design, there is translational symmetry between the fuel element structures 112 by which a feature on one fuel element structure 112 is repeated on other fuel element structures 112 at a constant distance (or constant pitch). Based on whether one is comparing, for example, between nearest neighbors, or next nearest neighbors, the repeated structure can be at a multiple of the pitches. An example suitable pitch is 3 cm to 10 cm, alternatively 3 cm to 6 cm or, further alternatively, is 4 cm, depending on material selection and performance. FIG. 3 illustrates an example of the tri-pitch design. The center axis of the coolant channel 128 is at distance P1 from each of the center axis of the coolant channel 128 of a nearest neighbor fuel element structure 112, and at a distance P2 (where P2=2×P1) from a next nearest neighbor. The plurality of fuel element structures 112 each have a cross-section with a polygonal shape. In the illustrated example, the plurality of fuel element structures 112 each have a hexagonal cross-sectional shape. Other regular polygonal shaped cross-sections can also be implemented; however, other shapes may require multiple shapes in one active core region design, e.g., a combination of octagons and squares.

Also for example, FIG. 3 illustrates the first surface 132 of the core former 130 being conformal to the radially outer surface 126 of the active core region 110. Similarly, FIG. 3 illustrates the second surface 134 of the core former 130 being conformal to a radially inner surface 152 of the reflector 150 and the second surface 134 of the core former 130 is conformal to a radially inner surface 152 of the reflector 150.

Figure 4A:
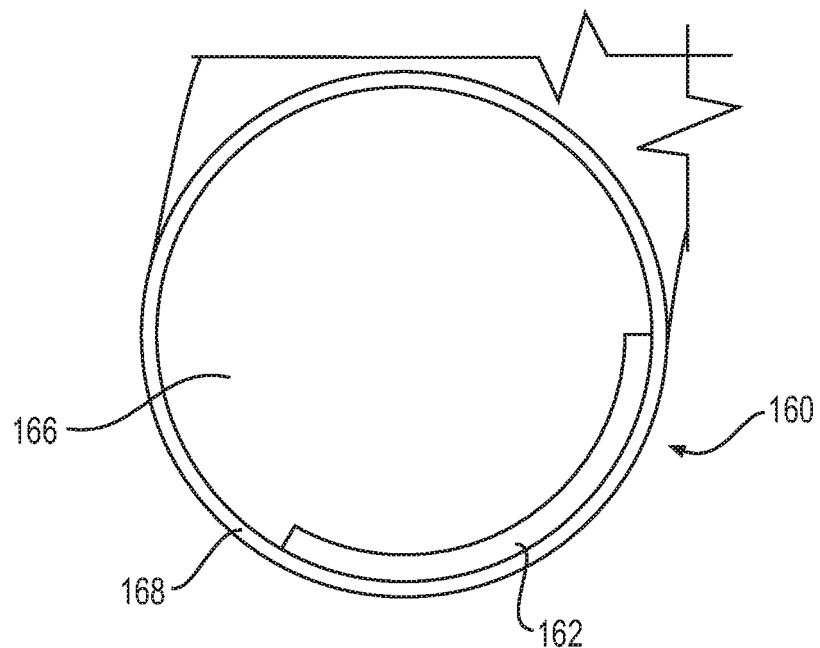
FIGS. 4A to 4C show embodiments of the neutron absorber structure in the reflector and related features.
Figure 4B:
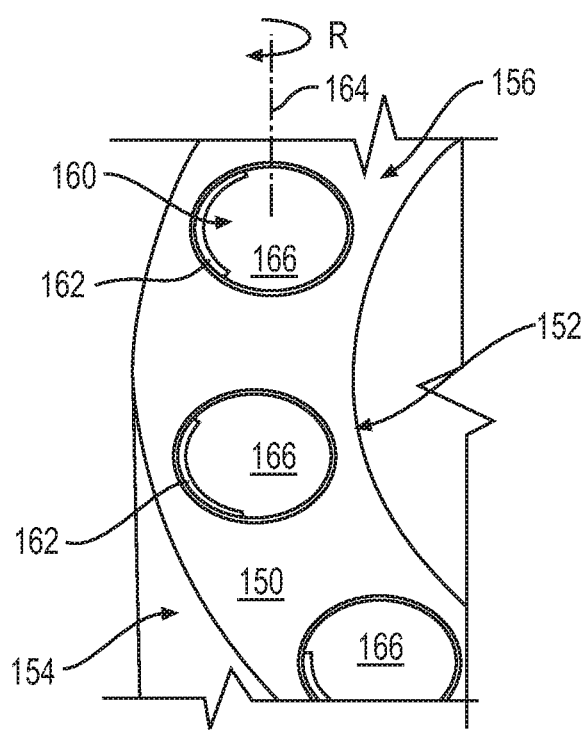
Figure 4C:
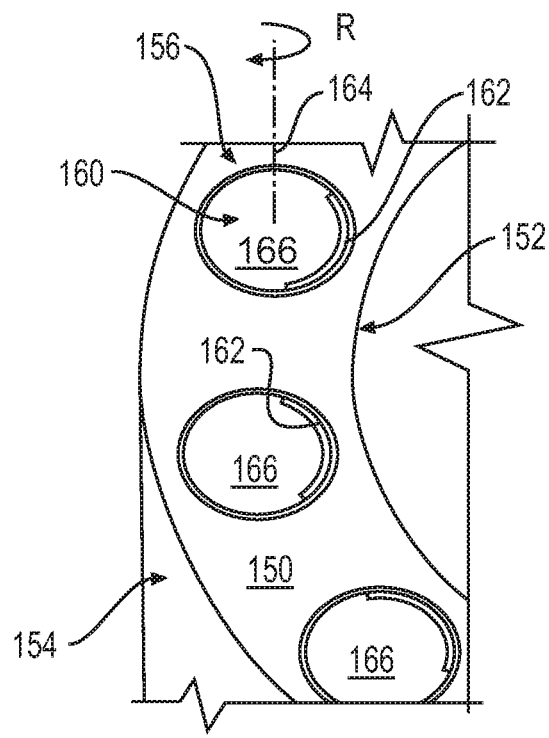

Additional structure illustrated in FIG. 3 is the neutron absorber body 162 of the neutron absorber structure 160. FIGS. 4A to 4C also show embodiments of the neutron absorber structure 160 in the reflector 150 and related features. As noted herein, the neutron absorber structures 160 are located within a volume of the reflector 150, where the volume is defined by the radially inner surface 152, the radially outer surface 154, and the top surface 156 and bottom surface 158 (not shown) of the reflector 150. As shown in FIGS. 3 and 4A to 4C, the neutron absorber structure 160 includes a cylindrical drum 166 encased in a tube 168. The neutron absorber body 162 occupies a first portion of the cylindrical drum 166. This first portion of the cylindrical drum 166 is a volume of the cylindrical drum 166 that includes a portion of an exterior surface of the cylindrical drum 166 (such as, for example, a 120 degree arc of a circumference of the cylindrical drum). When the tube 168 and the cylindrical drum 166 move as a unit, such as rotating (R) relative to an inner diameter surface of the reflector absorber housing, the cylindrical drum 166, the neutron absorber body 162, and the tube 168 slide along the inner surface of the reflector absorber housing. A motor (not shown in FIGS. 3 and 4A to 4C) can be operatively attached to the tube 168 by a drum shaft to rotate the neutron absorber structure 160. FIGS. 4B and 4C illustrate examples of a first position of the neutron absorber body 162 being radially closer to the active core region than the second position (compare FIG. 4C showing the neutron absorber body 162 in a first position to FIG. 4B showing the neutron absorber body 162 in a second position), in this case with the first position in FIG. 4C being radially closest to the active core region 110 and the second position in FIG. 4B being radially farthest from the active core region 110.

The cylindrical drum 166 other than the portion occupied by the neutron absorber body 162, i.e., a second portion of the cylindrical drum, functions as a secondary reflector. In some embodiments, the secondary reflector can be manufactured of the same material as the reflector 150 so that the reflector 150 has a substantially uniform neutronics characteristic across the radial cross-section of the reflector 150 (whether that radial cross-section includes a neutron absorber structure 160 or not). In specific embodiments, the reflector 150 and the cylindrical drum 166 are formed of suitable neutron thermalizing materials, such as beryllium, beryllium oxide, and graphite, as well as combinations of such materials. However, in other embodiments, the secondary reflector and the reflector 150 are made of different materials. Materials suitable for neutron absorber body 162 include $B_4C$, europium(III) oxide and dysprosium(III) oxide. Materials suitable for the tube 168 include most forms of steel, molybdenum, tungsten and other exotic alloy combinations. However, other materials can be used as long as they do not materially interfere with the neutron absorbing function of the neutron absorber body 162. In specific embodiments, the tube 168 is a stainless steel tube.

Figure 5:
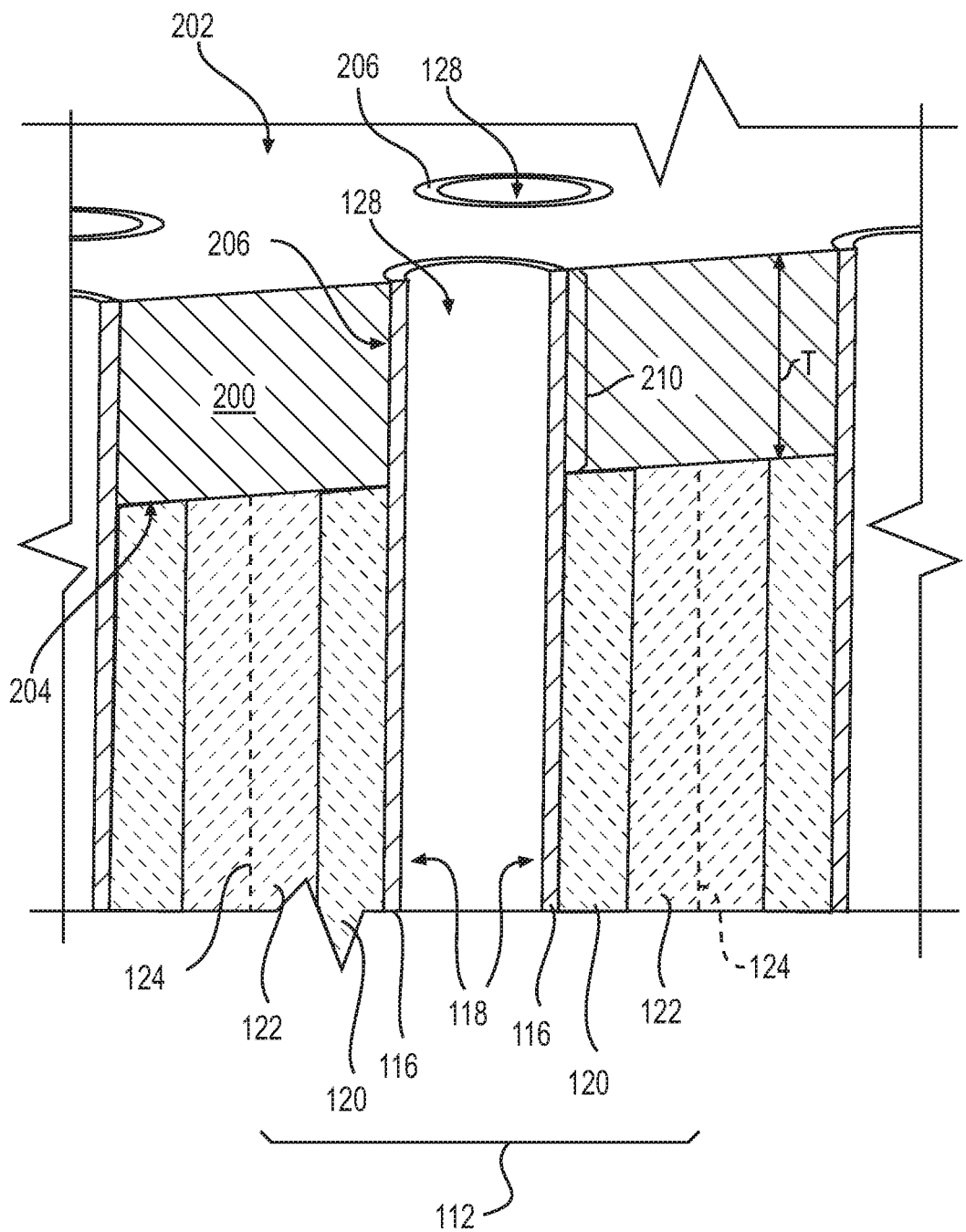
FIG. 5 schematically illustrates in cross-section an upper section of the nuclear propulsion fission reactor structure including an example of an upper core plate.

Other features of the example embodiment of the nuclear propulsion fission reactor structure 100 include an upper core plate and a lower core plate. FIG. 5 schematically illustrates in cross-section an upper section of the nuclear propulsion fission reactor structure 100 including an example of an upper core plate 200. The upper core plate 200 includes a first side 202 and a second side 204 and a plurality of openings 206. The openings 206 extend from the first side 202 to the second side 204 of the upper core plate 200. Each fuel element structure 112 (the outer surfaces 124 of the moderator body 122 of each fuel element structure 112 is denoted by dashed lines in FIG. 5) is associated with one opening 206 such that a first portion of each of the cladding bodies 116, such as first end 210, extends into a different one of the plurality of openings 206 and is joined to the upper core plate 200. For example, the first end 210 of the cladding body 116 can extend at least partially (relative to the length) into the opening 206. Alternatively, the first end 210 of the cladding body 116 extends into the opening 206 a distance that is coextensive with the thickness (T) of the upper core plate 200. After extending the first end 210 into the opening 206, the first portion of each of the cladding bodies 116 is joined to the upper core plate 200 by any suitable means, such as be welding, including resistance welding, full-penetration welding, or by suitable epoxy systems, such as J-B-weld®. As can be seen in FIG. 5, the coolant channel 128 defined by the inner surface 118 of the cladding body 116 concentrically mates to one of the plurality of openings 206 in the upper core plate 200.

Although not shown in FIG. 5, the lower core plate has corresponding features to the upper core plate 200, including a first side and a second side and a plurality of openings that extend from the first side to the second side of the lower core plate 250. The lower core plate 250 is attached to a second end of the fuel element structures 112 in the same way as upper core plate 200 is attached to the first end of the fuel element structures 112. Namely, a second end of the cladding body 116 extends into a different one of the plurality of openings in the lower core plate 250. For example, the second end of the cladding body 116 can extend at least partially (relative to the length) into the opening in the lower core plate. Alternatively, the second end of the cladding body 116 extends into the opening in the lower core plate 250 a distance that is coextensive with the thickness of the lower core plate 250. After extending the second end of the cladding body 116 into the opening in the lower core plate 250, the second portion of each of the cladding bodies 116 is joined to the lower core plate 250 by any suitable means, such as be welding, including resistance welding and full-penetration welding, or by suitable epoxy systems, such as J-B-weld®. Also, similar to the upper core plate 200, the coolant channel 128 defined by the inner surface 118 of the cladding body 116 mates to one of the plurality of openings in the lower core plate 250.

As illustrated, in part, in FIG. 5 and discussed above, at least a portion of the upper core plate 200, at least a portion of the lower core plate 250, and the cladding body 116 of each fuel element structure 112 form a first portion of a containment structure for the nuclear propulsion fission reactor structure 100 (i.e., propellant to fission product separation).

Figure 6C:
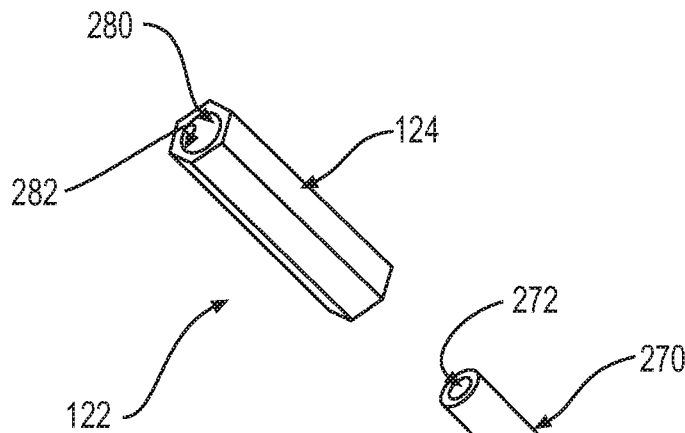
FIGS. 6A-D show components of an example fuel element structure in unassembled, schematic, perspective view (FIGS. 6A to 6C) and in an assembled, cross-sectional view (FIG. 6D).
Figure 6B:
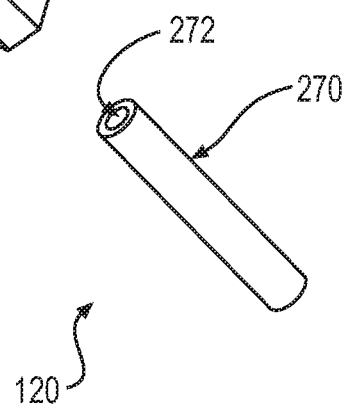
Figure 6A:
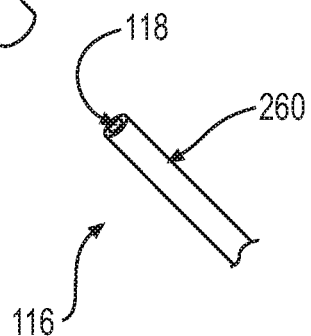
Figure 6D:
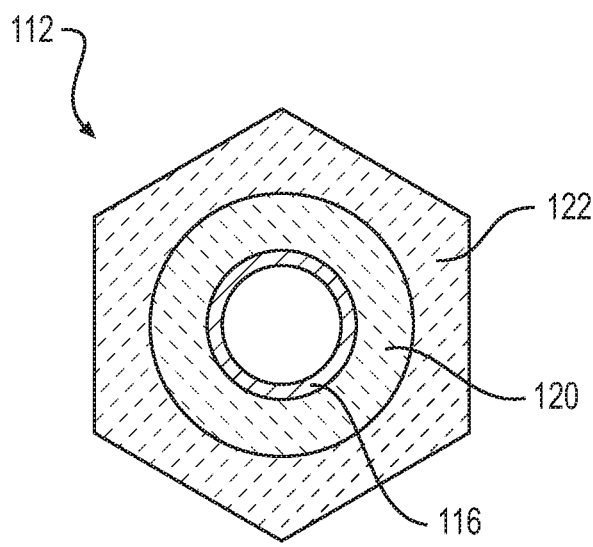

FIGS. 6A-D show components of an example fuel element structure in unassembled, schematic, perspective view (FIGS. 6A to 6C) and in an assembled, cross-sectional view (FIG. 6D). FIG. 6A illustrates an embodiment of the cladding body 116. The cladding body 116 is substantially in the shape of a tube with an outer surface 260 and an inner surface 118, which defines a coolant channel. When the tube is a cylindrical tube, the outer surface 260 is an outer diameter surface and the inner surface 118 is an inner diameter surface. In some embodiments, the cladding body 116 is a continuous, extruded tube that spans the height of the active core region 110. Embodying the cladding body 116 as an extruded tube reduces or eliminates seaming and the need for weld joints in the cladding body 116, which reduces the risk of failure of the component during operation as well as reduces manufacturing complexity.

FIG. 6B illustrates an embodiment of the fuel composition body 120. The fuel composition body 120 is substantially in the shape of an annular cylinder with an tube with an outer surface 270 and an inner surface 272. The inner surface 272 defines a space into which the cladding body 116 fits. For example, when the cladding body 116 is a cylindrical tube, the inner surface 272 is sized to complement the outer diameter surface of the cladding body 116. The composition body 120 and the cladding body 116 can be joined by, for example, sliding the cladding body 116 into the space defined by the inner surfaces 272 of the fuel composition body 120 and press fitting the two components or joining the two components in a hot isostatic pressing (HIP) operation.

FIG. 6C illustrates an embodiment of the moderator composition body 122. The moderator composition body 122 is substantially in the shape of a polygon-shaped sleeve with a central opening 280 and planar outer surfaces 124. In the illustrated embodiment, the moderator composition body 122 is an annular hexagon, although the moderator composition body 122 can take other shapes, including other polygon and regular polygon shapes. The annular hexagon shape of the moderator composition body 122 includes an outer surface 124 and a central opening 280 with an inner surface 282. The inner surface 282 defines a space into which the fuel composition body 120 (or the fuel composition body 120 joined with the cladding body 116) fits. The composition body 120 and the cladding body 116 can be assembled by, for example, sliding the fuel composition body 120 (or the fuel composition body 120 joined with the cladding body 116) into the space defined by the inner surfaces 282 of the moderator composition body 122. No intimate attachment is required between the moderator composition body 122 and the outer surface of the fuel composition body 120, although the two components can optionally be joined by, for example, press fitting or hot isostatic pressing.

FIG. 6D is a cross-sectional view of an embodiment of an assembled fuel element structure 112 and showing the relative locations within the assembled fuel element structure 112 of the tube-shaped cladding body 116, the annular cylindrical-shaped fuel composition body 120, and the moderator composition body 122 in the form of a polygon-shaped sleeve.

Figure 7:
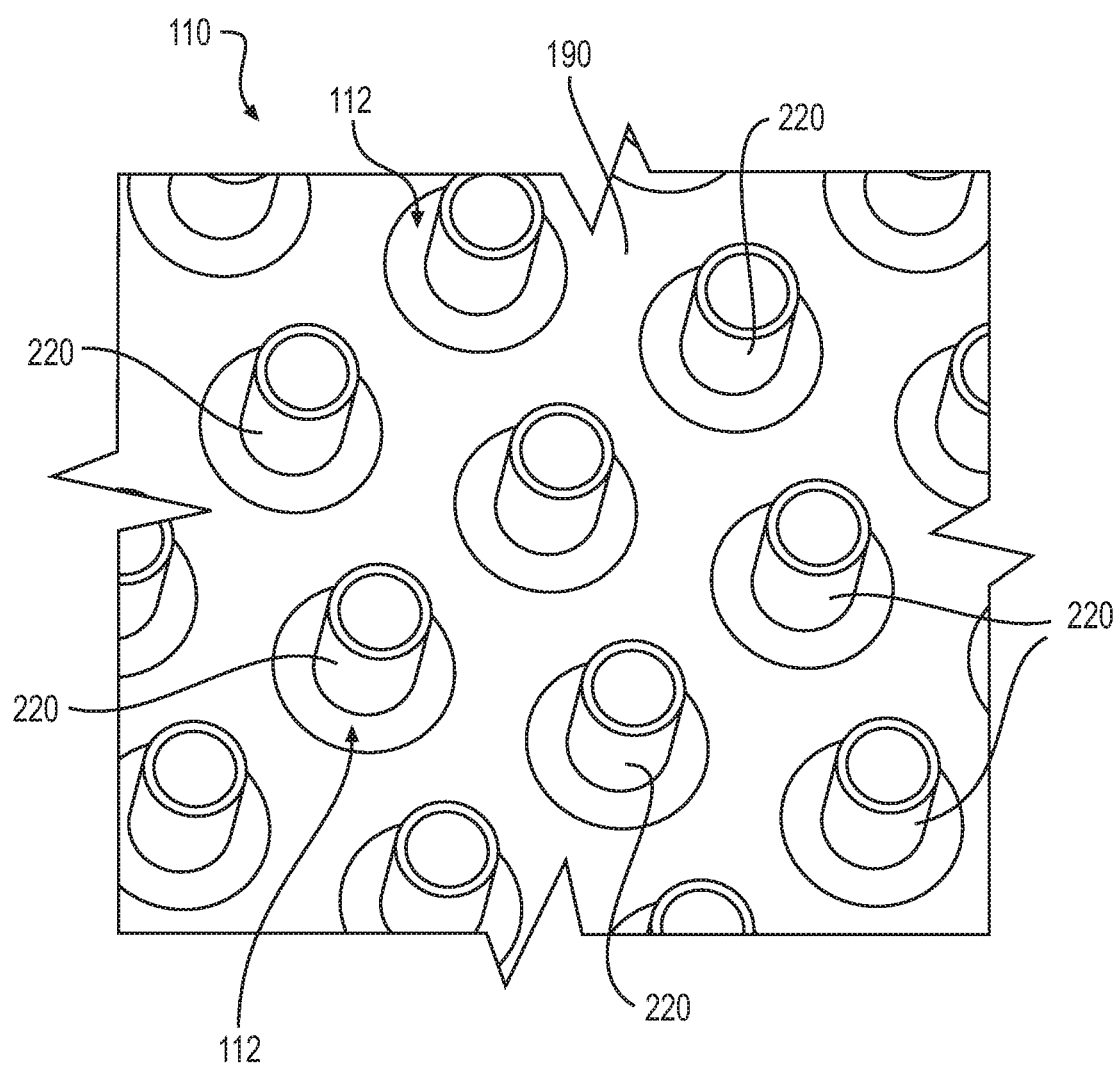
FIG. 7 is a schematic, perspective view of a portion of the top side of an active core region showing one end of a plurality of assembled fuel element structure.

FIG. 7 is a schematic, perspective view of a portion of the top side of an active core region showing one end of a plurality of assembled fuel element structure. In the FIG. 7 view, the assembled fuel element structures 112 are assembled in the active core region 110 with outer surfaces 124 of the moderator composition body 122 of the fuel element structure 112 abutting outer surfaces 124 of the moderator composition bodies 122 of a plurality of nearest neighbor fuel element structures 112, which results in an essentially continuous moderator body. In some embodiments, more than one fuel element 112 can be manufactured together in a single component, i.e., as active core sections larger than one fuel element 112. The axial end surfaces of the moderator composition body 122 and the fuel composition body 120 are (relative to each other) in the same plane (or substantially so) and forms a substantially planar upper surface 190 of the active core region 110. In each fuel element structure 112, a portion 220 of the cladding body 116 extends axially past both the axial end of the moderator composition body 122 and the fuel composition body 120. FIG. 7 corresponds to an end of the assembled fuel element structures 112 on which the upper core plate 200 will be joined.

From FIG. 7, one can understand that an opposite end of the assembled fuel element structures 112 has a similar substantially planar surface with protruding portions of the cladding body 116 extending axially past both the axial end of the moderator composition body 122 and the fuel composition body 120 and corresponding to an end of the assembled fuel element structures 112 on which the lower core plate 250 will be joined.

Figure 8:
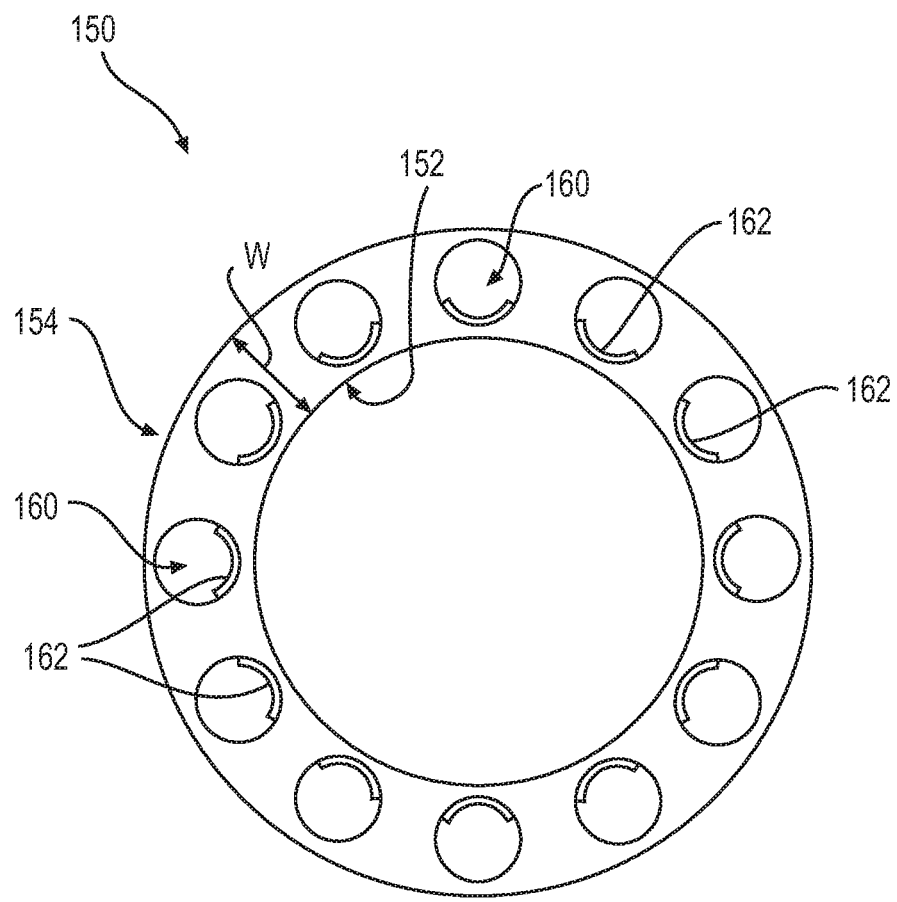
FIG. 8 is a schematic, cross-sectional view of an embodiment of a reflector.

FIG. 8 is a schematic, cross-sectional view of an embodiment of a reflector. The reflector 150 surrounds the active core region 110, mating with the core former 130 that bridges the geometry of the outer surface 126 of the active core region 110 (such as formed by hexagonal surfaces 124 of the fuel element structure 112) with the uniform inside annular reflector surface 152. Neutron absorber structures 160 are contained within the volume of the reflector 150. In the FIG. 8 embodiment, the neutron absorber bodies 162 are shown with the drum-like cylindrical neutron absorber structures 160 being turned inward, in a position corresponding to a shutdown configuration for the nuclear propulsion fission reactor structure 100. The drum-like cylindrical neutron absorber structures 160 are constructed so the that neutron absorber bodies 162 can be located radially equidistant from the axial centerline of the active core region 110 so as to smooth out fission hotspots.

The reflector 150 functions to thermalize "reflected" neutrons travelling back into the active core region 110 to increase criticality and reduces "leakage" of neutrons, which would have no chance to generate fission reactions and thus lowers the criticality potential of the nuclear propulsion fission reactor structure. Secondarily, the reflector houses the neutron absorber structures 160, which are the primary system for reactivity control. In FIG. 8, the embodiment of neutron absorber structures 160 are in the form of rotatable control drums. In order to house sufficiently sized neutron absorber structures 160 in the form of rotatable control drums to control reactivity, the reflector cannot be overly thin (in width (W) between inner surface 152 and outer surface 154). In exemplary embodiments, the width (W) is 15 cm to 30 cm for a beryllium-based reflector. The width may vary based on the materials of the reflector and the weight requirements for non-terrestrial applications of the nuclear propulsion fission reactor structure, with materials with lower neutron reflecting properties requiring a thicker reflector, i.e., a large width (W).

Figure 9:
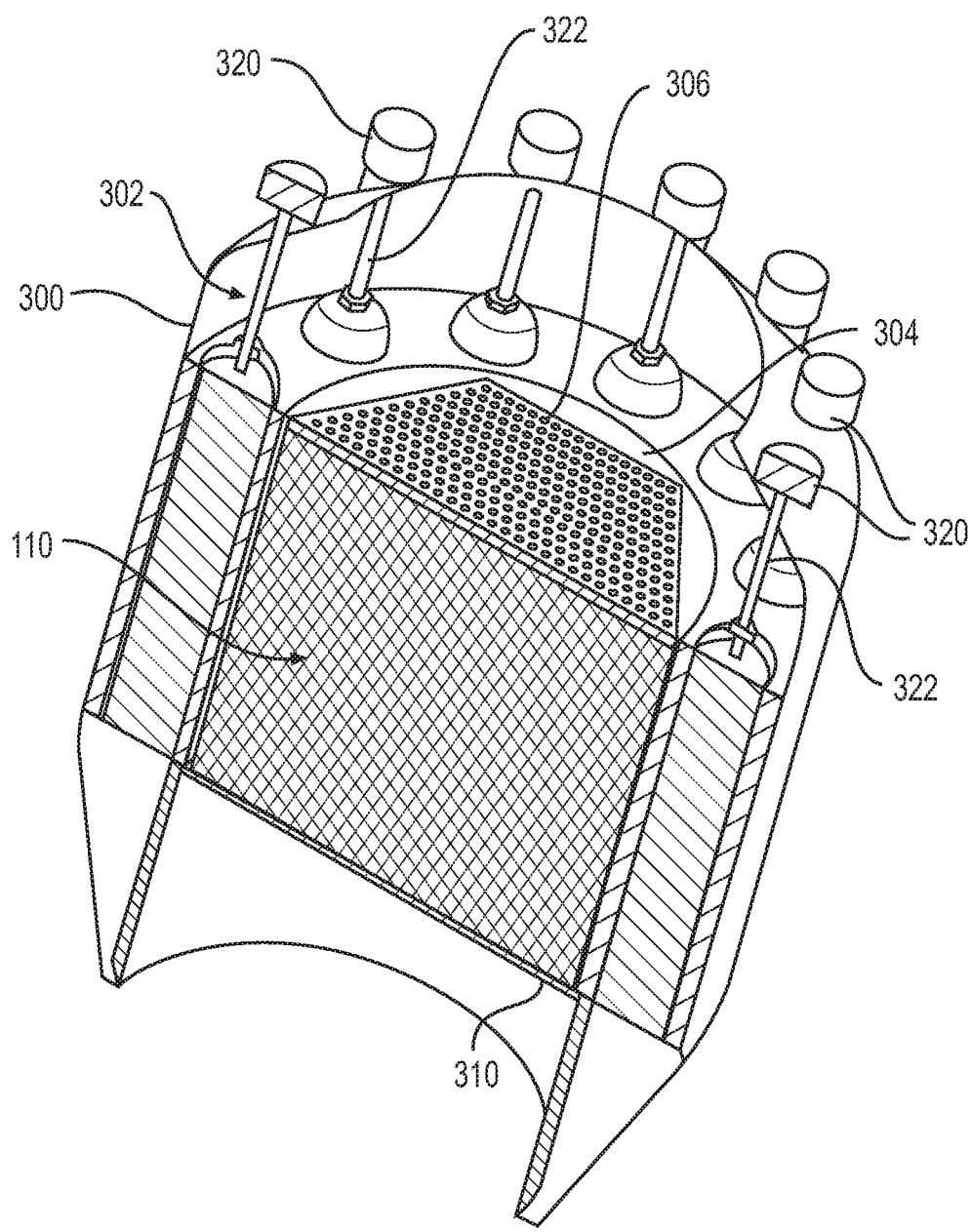
FIG. 9 schematically illustrates an embodiment of a nuclear propulsion fission reactor structure with a hull.

The nuclear propulsion fission reactor structure can further comprise a hull. FIG. 9 schematically illustrates an embodiment of a nuclear propulsion fission reactor structure 100 with a hull 300. The reactor structure, which includes the active core region 110, the core former 130, the upper core plate 200, the lower core plate 250, the reflector 130, and the plurality of neutron absorber structures 160, is housed within an interior volume 302 of the hull 300. An upper reactor plate 304 is positioned above (or outward) the first side 202 of the upper core plate 200 and includes a plurality of holes 306 for passage of a propulsion gas. The plurality of holes are in fluid communication with the coolant channels 128 in the active core region 110 such that, after passage of the propulsion gas through the plurality of holes 306, the propulsion gas passes through the coolant channels 128 and functions as a coolant for the nuclear propulsion fission reactor structure 100. Similarly, a lower reactor plate 310 is positioned below (or outward) the lower core plate 250 and includes a plurality of holes 306 for passage of the propulsion gas exiting the coolant channels 128.

Also shown in FIG. 9 are motors 320 operatively attached to the cylindrical drum 166 of the neutron absorber structures 160 by a drum shaft 322 to rotate the cylindrical drum 166. In the illustrated embodiment, the motors 320 are external to the hull 300 and the drum shaft 322 penetrates the hull 300, for example by ports or other openings 324 in the hull 300.

Figure 10A:
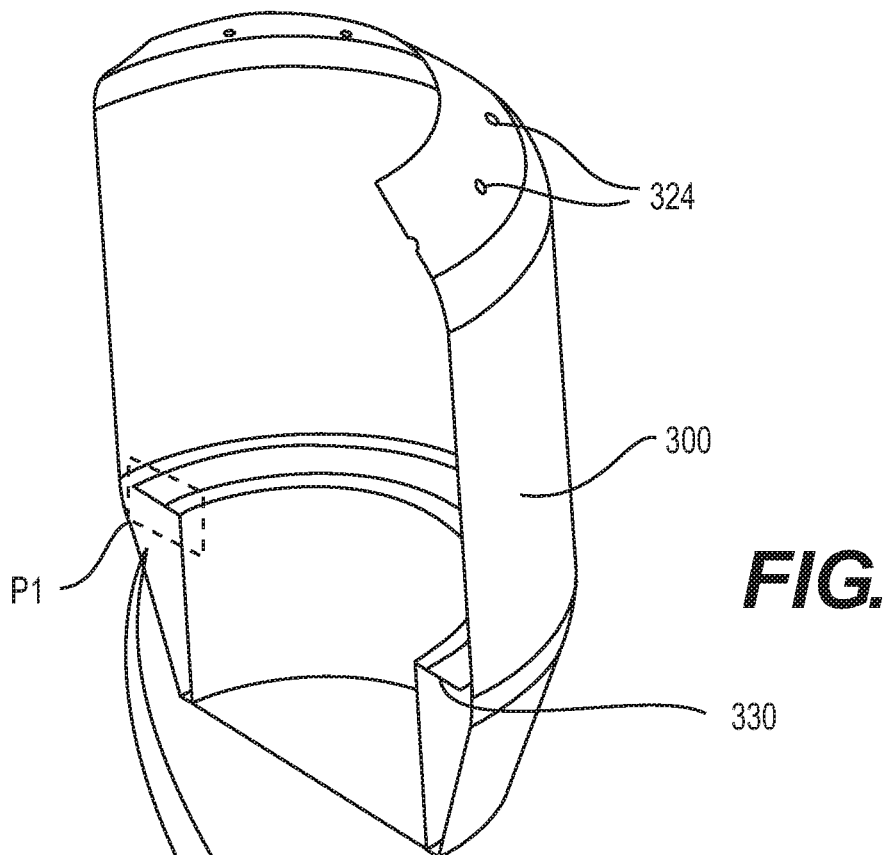
FIG. 10A illustrates an embodiment of a hull and FIG. 10B is a magnified view of portion P1 in FIG. 10A illustrating an embodiment of an interface between the reactor structure and the hull.
Figure 10B:
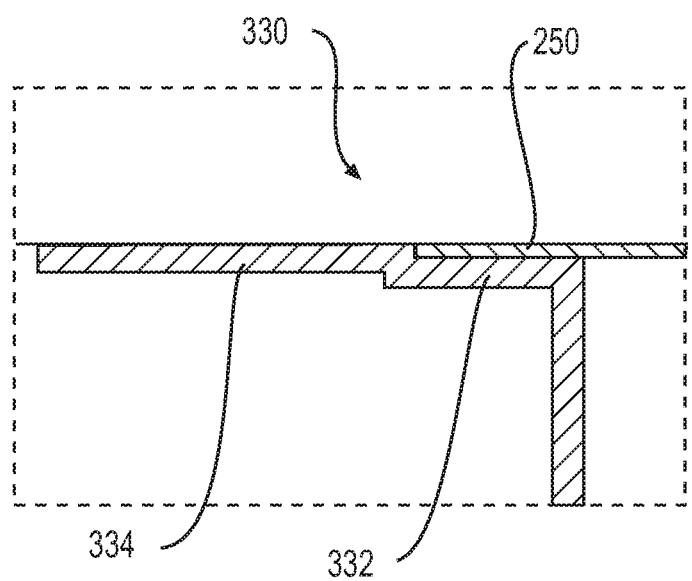

Embodiments of the hull 300 are formed from a sheet of material, such as stainless steel, and can include ribs or other reinforcement structures to provide additional structural support. As seen in FIG. 10A, the hull 300 can be one contiguous component. However, in other embodiments, the hull 300 can be multiple components that are then assembled together with fasteners. An inner ledge 330 of the hull 300 supports the reflector 130 and active core region 110. The inner ledge 330 can be attached to an interior surface of the hull 300 or can be formed by a portion of the interior surface of the hull 300. FIG. 10B (which is a magnified view of portion P1 in FIG. 10A) illustrates an example interface between the reactor structure and the hull 300. The lower core plate 250 of the active core region 110 rests on a lower core plate ledge portion 332 of the inner ledge 330 and forms a mechanical interface.

During operation and before the throat of the nozzle reaches Mach 1, the incoming flow must overcome the increasing pressure in the converging nozzle section. This can cause potential back-flow conditions if a crack is present below the active core region 110, e.g., in the space within the hull 300 below the reactor structure. Therefore, the seal of the mechanical interface between the lower core plate ledge portion 332 and the lower core plate 250 should be as stable as possible during start-up to prevent leakage into the reflector 130 and active core region 110. At operational, steady-state conditions (i.e., when nozzle throat Mach 1) and after shocks have left the diverging section), the acceleration of the flow through the diverging nozzle section will "pull" the flow, causing a seal the to be formed between the lower core plate ledge portion 332 and the lower core plate 250 due to negative dynamic pressure differential.

The disclosure is also directed to a nuclear thermal propulsion engine that includes the nuclear propulsion fission reactor structure 110 within a hull 300. The nuclear thermal propulsion engine further includes shielding, turbo machinery, and a nozzle section attached to or supported by the hull 300, for example, as consistent with that shown and described in connection with FIG. 1. In exemplary embodiments, the active core region 110 rests on the lower core plate ledge portion 332 of the inner ledge 330, the reflector 130 is attached by fasteners, such as bolts or pins, to the reflector ledge portion 334 of the inner ledge 330, drum shafts 322 operatively attach a motor 320 (affixed to the hull via, for example, a motor support plate) to the neutron absorber structures 160 and pass through openings 324 in the top of the hull 300. The nozzle section bolts to the bottom of the hull 300 and shielding and turbomachinery is affixed to the top of the hull 300. A reservoir for cryogenically storing a propulsion gas is operatively connected, along with the shielding and turbo machinery, to provide a flow path from the reservoir to the nuclear propulsion reactor and the nozzle section is operatively connected to provide a flow path for superheated propulsion gas exiting the nuclear propulsion reactor.

The nuclear propulsion fission reactor structure (as well as a nuclear thermal propulsion engine including the nuclear propulsion fission reactor structure) can be manufactured using suitable means. In general, the nuclear propulsion fission reactor structure is manufactured by a method that comprises joining cladding bodies to the lower core plate, sliding fuel composition bodies and moderator bodies into place over the radially inner feature, e.g., the fuel composition bodies over the cladding bodies and the moderator bodies over the assembled fuel composition bodies—cladding bodies to form a fuel element structure, and joining the upper core plate to a portion of each cladding body that axially extends past the fuel composition bodies and moderator bodies. Subsequently, a reflector is positioned about an outer surface of the assembled fuel element structures and an inner surface of the reflector is mated to an outer surface of the assembled fuel element structures with a core former.

Figure 11:
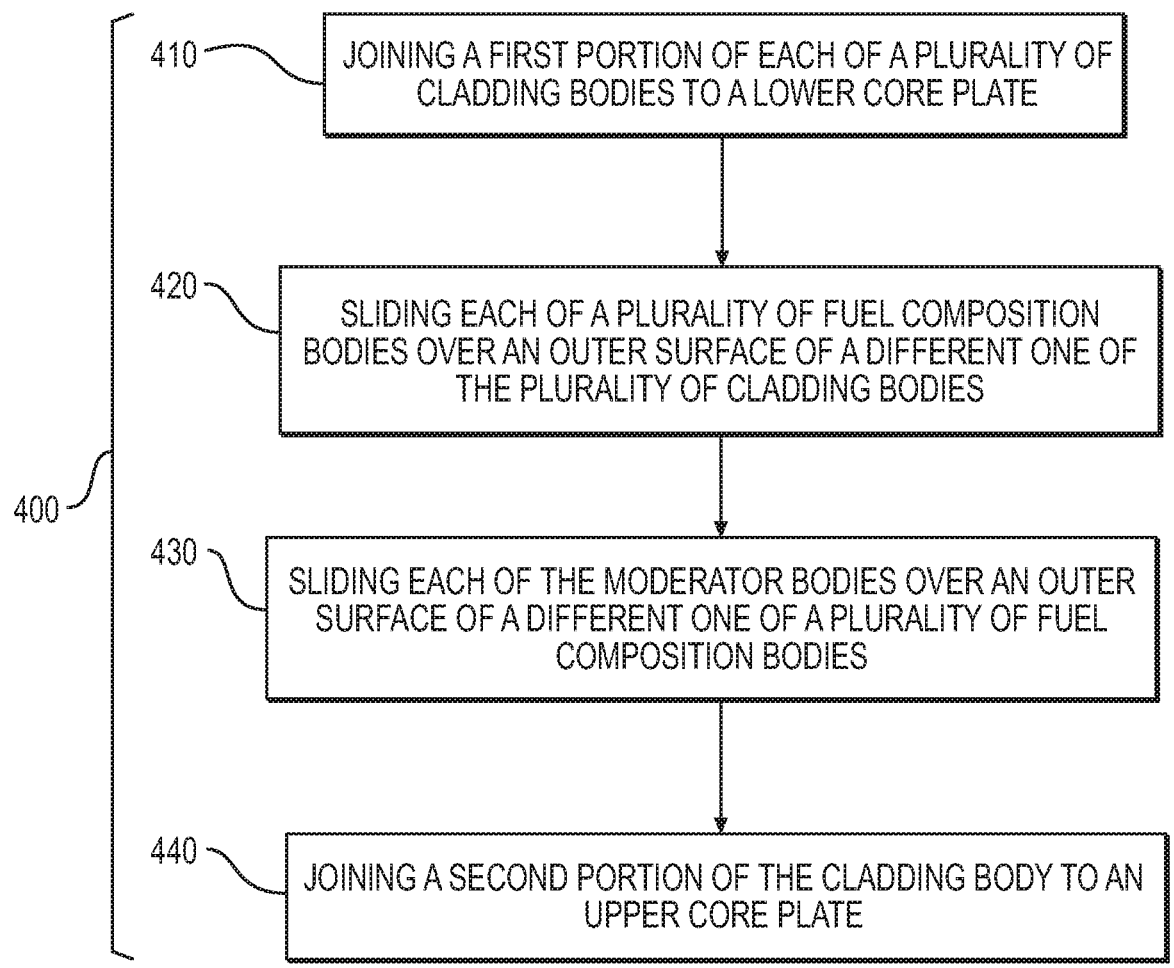
FIG. 11 is a flow diagram setting forth foundational steps in an embodiment of a method of manufacturing a nuclear propulsion fission reactor structure.

FIG. 11 is a flow diagram setting forth foundational steps in an embodiment of a method of manufacturing a nuclear propulsion fission reactor structure. The method 400 comprises 410 joining a first portion of each of a plurality of cladding bodies to a lower core plate. Each cladding body 116 has an inner surface 118 defining a coolant channel 128 and the lower core plate 250 includes a plurality of openings extending from a first side of the lower core plate to a second side of the lower core plate. When joining the cladding body 116 to the lower core plate 250, a first portion of each cladding body 116 extends into a different one of the plurality of openings in the lower core plate 250. When joining the cladding bodies 116 to the lower core plate 250, it is preferable that the whole interface between the first portion and the lower core plate be joined together, for example by welding, to form a continuous metal body including the cladding bodies 116 and the lower core plate 250.

The method 400 also comprises 420 sliding each of a plurality of fuel composition bodies over an outer surface of a different one of the plurality of cladding bodies. Each fuel composition body 120 has the shape of an annular cylinder. When the fuel composition body 120 has been positioned over an outer surface 260 of the cladding body 116, an inner surface 272 of the annular cylinder of the fuel composition body 120 is oriented toward the outer surface 260 of the cladding body 116. Because the first portion of the cladding body 116 extends into an opening in the lower core plate 250, the fuel composition body 120 is prevented by the lower core plate 250 from extending to the same axial position as the end of the cladding body 116. Therefore, the first portion of the cladding body 116 extends axially past a first axial end of the fuel composition body 120. To similarly provide a portion of the cladding body 116 for joining to an opening 206 in an upper core plate 200, a second portion of the cladding body 116 extends axially past a second axial end of the fuel composition body 120. After positioning the fuel composition body 120 over an outer surface 260 of the cladding body 116, the fuel composition body 120 and cladding body 116 can be affixed or otherwise joined together by, for example, press fitting or hot isostatic pressing (HIP).

The method 400 also comprises 430 sliding each of the moderator bodies over an outer surface of a different one of a plurality of fuel composition bodies. Each moderator body 122, in a cross-section, has a periphery having a regular polygonal shape (in particular embodiments, a hexagonal shape) and an inner opening 280. When the moderator body 122 has been positioned over an outer surface 270 of the fuel composition body 120, a surface 282 of the inner opening 280 of the moderator body 122 is oriented toward the outer surface 270 of the annular cylinder of the fuel composition body 120. No intimate attachment is required between the moderator composition body 122 and the outer surface 270 of the fuel composition body 120, although the two components can optionally be joined by, for example, press fitting or hot isostatic pressing.

The method 400 also comprises 440 joining a second portion of the cladding body to an upper core plate. The upper core plate 200 includes a plurality of openings 206 extending from a first side 202 of the upper core plate 200 to a second side 204 of the upper core plate 200. The second portion of the cladding body 116 (which extends axially past an axial end of the fuel composition body 120) is inserted into the opening 206 and joined to the upper core plate 200. When joining the cladding bodies 116 to the upper core plate 200, it is preferable that the whole interface between the second portion and the upper core plate be joined together, for example by welding, to form a continuous metal body including the cladding bodies 116 and the upper core plate 200. It should be noted that the joining of the cladding bodies 116 of each fuel element structure to the upper core plate 200 and lower core plate 250 a portion of the upper core plate forms a first portion of the containment structure for the nuclear propulsion fission reactor structure 100. Also, because inner surfaces 118 of the cladding bodies 116 define coolant channels 128, having the first and second portions inserted into openings in the lower and upper core plates, respectively, the coolant channels 128 of the cladding bodies 116 similarly extend into the openings in the lower and upper core plates.

Each fuel element structure 112, which includes the assembled cladding body 116, fuel composition body 120 that is radially outward of the cladding body 116, and moderator composition body 122 that is radially outward of the fuel composition body 120, is arranged in the active core region 110 such that an outer surface 124 of a moderator body 122 of a first fuel element structure abuts an outer surface 124 of a moderator body 122 of a plurality of nearest neighbor fuel element structures, for example, in a tri-pitch relationship.

After assembling the fuel element structures 112 in the active core region 110, a reflector 150 is positioned about an outer surface 126 of assembled fuel element structures 112. The core former 130 assists in mating an inner surface 152 of the reflector 150 to the outer surface 126 of the assembled fuel element structures 112. The reflector 150 forms a second portion of the containment structure for the nuclear propulsion fission reactor structure 100 as the core former 130 will also mate with the upper core plate 200 and the lower core plate 250.

It should be noted that other features and structures of the nuclear propulsion fission reactor structure 100 can be manufactured as part of the method or supplied for use in the method. Thus, the method 400 can optionally include one or more of any of the following: forming the plurality of cladding bodies 116, forming the plurality of fuel composition bodies 120; and forming the plurality of moderator bodies 122. Forming the plurality of cladding bodies 116 is by any suitable technique, including metal working techniques such as extrusion. Forming the plurality of fuel composition bodies 120 can be by any suitable technique, including a fuel compaction technique or an additive manufacturing technique. Forming the plurality of moderator bodies 122 can be by any suitable technique, including powder compaction or an additive manufacturing technique.

In some manufacturing methods or steps in manufacturing methods, features and structures (or portions thereof) of the nuclear propulsion fission reactor structure 100 are manufactured as an integral, unitary structure using, for example, an additive manufacturing process. As used herein, additive manufacturing processes include any technologies that build 3D objects by adding material on a layer-upon-layer basis. An example of a suitable additive manufacturing process utilizes 3D printing of metal alloys, such as molybdenum-containing metal alloy, Zircaloy-4 or Hastelloy X, or 3D printing of ceramics, such as uranium or beryllium oxide, to form the noted structural features such as the cladding or fuel. In other embodiments, the fissionable nuclear fuel composition and/or the thermal transfer agent and/or the moderator materials and/or poisons used as part of the nuclear propulsion fission reactor structure 100 can be included within the integral, unitary structure when suitable multi-material, additive manufacturing processes with multiple metals and ceramics within the feedstock are employed. If the molten metal is not included in the additive manufacturing process, the additive manufacturing process can be paused, a volume of molten metal placed into the fuel cavity (either in liquid or solid form) and the additive manufacturing process continued to complete the structure of the closed chamber. Other alloys that can be used when suitable multi-material, additive manufacturing processes with multiple metals within the feedstock are employed include: steel alloys, zirconium alloys, and molybdenum-tungsten alloys (for the cladding and/or for the containment structure); beryllium alloys (for the reflector); and stainless steel (for the containment structure). Even when not manufactured by an additive manufacturing process, the above materials can be used in manufacturing the various features and structures disclosed herein.

Additionally, although the disclosed reactor and core have complex mechanical geometries, integral and iterative manufacturing on a layer-by-layer basis using additive manufacturing techniques, such as 3D printing, of elemental metal or metal alloys enables the structure and features disclosed herein to be more easily manufactured.

Additive manufacturing techniques for the manufacture of integral and unitary structures can include the additional steps of: (a) predictive and causal analytics, (b) in-situ monitoring combined with machine vision and accelerated processing during the layer-by-layer fabrication of the structure, (c) automated analysis combined with a machine learning component, and (d) virtual inspection of a digital representation of the as-built structure. In addition, additive manufacturing technology can create complex geometries and, when coupled with in-situ sensors, machine vision imagery, and artificial intelligence, allows for tuning of the manufacturing quality as the components are built on a layer-by-layer additive basis (often, these layers are on the scale of 50 microns) and provides predictive quality assurance for the manufacture of such reactors and structures.

As used herein, cladding is the layer of fuel containing features that is located between the coolant and the nuclear fuel. The cladding functions as a safety barrier that prevents radioactive fission fragments from escaping the fuel into the coolant and contaminating it. Some design constraints of cladding include neutron absorption, radiation resistance and temperature behavior. The cladding is typically made of a corrosion-resistant material with low absorption cross section for thermal neutrons. Example materials include Zircaloy or steel, although other materials may be used if suitable to the reactor conditions, such as metallic and ceramic systems (Be, C, Mg, Zr, 0, and Si), as well as compositions including molybdenum, tungsten, rhenium, tantalum, hafnium and alloys thereof, including carbides. In some embodiments, the cladding material can be isotope enriched to enhance reactive through reduction of isotopes with higher neutron absorption cross-sections, e.g., molybdenum enriched Mo-92 will have a less parasitic neutron absorption cross-section than elemental molybdenum. In embodiments of the disclosed nuclear propulsion fission reactor structure, the upper and lower core plates are made of cladding material and, preferably have the same composition as the cladding bodies.

The fissionable nuclear fuel composition can be high-assay low-enriched uranium (HALEU) with has a $U^{235}$ assay above 5 percent but below 20 percent or can be highly enriched uranium (HEU) with uranium that is 20% or more $U^{235}$. A suitable fissionable nuclear fuel composition applicable to the disclosed fuel element structure includes uranium oxide ($UO_2$) that is less than 20% enriched, uranium with 10 wt. % molybdenum (U-10Mo), uranium nitride (UN), and other stable fissionable fuel compounds. Burnable poisons may also be included. Typically, the fissionable nuclear fuel composition is in the form of a ceramic-metal (cermet), such as $UO_2$ with W or Mo and UN with W or Mo. In some embodiments, a molten metal can also function as the "metal" portion of a cermet.

When used, a thermal transfer agent, such as a salt or metal that will be molten at operating temperatures, can be included in the fuel element structure to improve thermal coupling between the fuel composition body and the cladding body. Additionally, a thermal transfer agent can occupy cracks or other defects in the fuel element structure (whether originally present or developing during reactor operation) to promote thermal coupling. Suitable molten metals for inclusion in the disclosed nuclear propulsion fission reactor structure and to be included in the fuel element structure to provide thermal transfer contact includes sodium (Na), sodium-potassium (NaK), potassium (K), iron (Fe), copper (Cu), silver (Ag), lead (Pb), and bismuth (Bi), or alloy compositions thereof.

It is contemplated that various supporting and ancillary equipment can be incorporated into the disclosed nuclear propulsion fission reactor structure and nuclear thermal propulsion engine. For example, at least one of a moderator (such as a zirconium hydride (ZrH), beryllium (Be), beryllium oxide (BeO), water and graphite), a control rod (such as iridium control rod) for launch safety, and a scientific instrument (such as a temperature sensor or radiation detector) can be incorporated into the nuclear propulsion fission reactor structure.

The disclosed arrangements pertain to any configuration in which a heat generating source including a fissionable nuclear fuel composition, whether a fuel element or the fissionable nuclear fuel composition per se, is surrounded by cladding. Although generally described herein in connection with a gas-cooled nuclear thermal propulsion reactors (NTP reactors), the structures and methods disclosed herein can also be applicable to other fission reactor systems.

Nuclear propulsion fission reactor structure disclosed herein can be used in suitable applications including, but not limited to, non-terrestrial power applications, space power, space propulsion, and naval applications, including submersibles.

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. A nuclear propulsion fission reactor structure, comprising:
   an active core region including a plurality of fuel element structures and having an axial centerline defining a longitudinal axis of the nuclear propulsion reactor;
   a core former radially outward of the active core region;
   a reflector radially outward of the core former and having a radially inner surface oriented toward the active core region; and
   a plurality of neutron absorber structures located within a volume of the reflector,
   wherein each fuel element structure includes a cladding body having an inner surface defining a coolant channel, a fuel composition body radially outward of and surrounding the cladding body, and a moderator composition body radially outward of and surrounding the fuel composition body,
   wherein an outer surface of a moderator composition body of a first fuel element structure abuts an outer surface of a moderator composition body of a plurality of nearest neighbor fuel element structures,
   wherein the core former has a first surface radially inward of a second surface and the first surface is conformal to a radially outer surface of the active core region and the second surface is conformal to the radially inner surface of the reflector, and
   wherein each of the plurality of neutron absorber structures includes a neutron absorber body movable between a first position and a second position, the first position being radially closer to the active core region than the second position.

2. The nuclear propulsion fission reactor structure according to claim 1, further comprising:
   an upper core plate; and
   a lower core plate,
   wherein the cladding body of each fuel element structure includes a first portion that extends axially past a first axial end of the fuel composition body and a second portion that extends axially past a second axial end of the fuel composition body, and
   wherein the first portion of each fuel element structure is joined to the upper core plate and the second portion of each fuel element structure is joined to the lower core plate.

3. The nuclear propulsion fission reactor structure according to claim 1, wherein the fuel composition body has the shape of an annular cylinder.

4. The nuclear propulsion fission reactor structure according to claim 1, wherein the fuel element structure has a cross section that has a polygonal shape.

5. The nuclear propulsion fission reactor structure according to claim 4, wherein the fuel element structure has a cross section that has a regular polygonal shape.

6. The nuclear propulsion fission reactor structure according to claim 4, wherein the regular polygonal shape is a hexagon.

7. The nuclear propulsion fission reactor structure according to claim 1, wherein side surfaces of the fuel element structures are in direct contact with side surfaces of adjacent fuel element structures.

8. The nuclear propulsion fission reactor structure according to claim 1, wherein an arrangement of the plurality of fuel element structures in the active core region has translational symmetry.

9. The nuclear propulsion fission reactor structure according to claim 8, wherein a distance between one or more repeated elements in the plurality of fuel element structures is constant.

10. The nuclear propulsion fission reactor structure according to claim 1, wherein a fuel composition of the fuel composition body includes (i) uranium oxide that is less than 20% enriched, (ii) uranium with 10 wt. % molybdenum (U-10Mo), (iii) uranium nitride (UN), or (iv) a cermet of (i), (ii) or (iii).

11. The nuclear propulsion fission reactor structure according to claim 1, wherein the neutron absorber body is movable between the first position and the second position to control reactivity of the active core region.

12. The nuclear propulsion fission reactor structure according to claim 1, wherein each cladding body is a continuous, extruded tube.

13. The nuclear propulsion fission reactor structure according to claim 1, wherein the cladding body has a composition that includes (i) molybdenum; (ii) tungsten; (iii) rhenium; (iv) tantalum; (v) hafnium; (vi) alloys of (i), (ii), (iii), (iv) or (v); or (vii) carbides of (i), (ii), (iii), (iv), or (v).

14. The nuclear propulsion fission reactor structure according to claim 1, wherein a first portion of the cladding body extends axially past a first axial end of the moderator composition body and a second portion of the cladding body extends axially past a second axial end of the moderator composition body.

15. The nuclear propulsion fission reactor structure according to claim 2, wherein a portion of the upper core plate, a portion of the lower core plate, and the cladding body of each fuel element structure form a portion of a containment structure for the nuclear propulsion reactor.

16. The nuclear propulsion fission reactor structure according to claim 1, wherein the fuel composition body has the shape of an annular cylinder, wherein the moderator composition body is a polygon-shaped sleeve with a central opening, and wherein an inner diameter of the central opening defines a space in which the fuel composition body is located.

17. The nuclear propulsion fission reactor structure according to claim 1, wherein, when the neutron absorber body of each of the plurality of neutron absorber structures is at the first position, the neutron absorber body of each of the plurality of neutron absorber structures is radially equidistant from the axial centerline of the active core region.

18. The nuclear propulsion fission reactor structure according to claim 1, wherein the neutron absorber body has a composition including beryllium, beryllium oxide, graphite, or combinations thereof.

19. The nuclear propulsion fission reactor structure according to claim 1, wherein each of the plurality of neutron absorber structures includes a cylindrical drum encased in a tube, wherein the neutron absorber body occupies a first portion of the cylindrical drum and a second portion of the cylindrical drum is a secondary reflector, and wherein the first portion of the cylindrical drum is a volume of the cylindrical drum that includes a portion of an exterior surface of the cylindrical drum.

20. The nuclear propulsion fission reactor structure according to claim 19, wherein the portion of the exterior surface of the cylindrical drum corresponds to a 120 degree arc of a circumference of the cylindrical drum,
wherein the tube is stainless steel,
wherein the cylindrical drum is rotatable, and
wherein a composition of the reflector includes beryllium, beryllium oxide or graphite, and wherein a composition of the secondary reflector includes beryllium, beryllium oxide or graphite.

21. The nuclear propulsion fission reactor structure according to claim 20, further including a motor operatively attached to the cylindrical drum by a drum shaft to rotate the cylindrical drum.

22. The nuclear propulsion fission reactor structure according to claim 1, wherein the coolant is a propulsion gas and the nuclear propulsion reactor further comprises an upper reactor plate including a plurality of first holes for passage of the propulsion gas and a lower reactor plate including a plurality of second holes for passage of the propulsion gas.

23. The nuclear propulsion fission reactor structure according to claim 2, further comprising a hull,
wherein the active core region, the core former, the upper core plate, the lower core plate, the reflector, and the plurality of neutron absorber structures form a reactor structure, and
wherein the reactor structure is housed within an interior volume of the hull.

24. The nuclear propulsion fission reactor structure according to claim 23, wherein the coolant is a propulsion gas and the nuclear propulsion reactor further comprises an upper reactor plate and a lower reactor plate, each reactor plate including a plurality of holes for passage of the propulsion gas.

25. The nuclear propulsion fission reactor structure according to claim 23, wherein the reactor structure is supported by a ledge attached to an interior surface of the hull or formed by a portion of the interior surface of the hull.

26. A nuclear thermal propulsion engine, comprising:
the nuclear propulsion fission reactor structure according to claim 23, shielding;
a reservoir for cryogenically storing a propulsion gas;
turbomachinery; and
a nozzle,
wherein the upper core plate is oriented toward a first end of the hull and the lower core plate is oriented toward a second end of the hull,
wherein shielding, turbomachinery, and the reservoir are operatively mounted to the first end of the hull to provide a flow path from the reservoir to the nuclear propulsion reactor, and
wherein the nozzle is operatively mounted to the second end of the hull to provide a flow path for superheated propulsion gas exiting the nuclear propulsion reactor.

27. A method of manufacturing a nuclear propulsion fission reactor structure, the method comprising:
joining a first portion of each of a plurality of cladding bodies to a lower core plate, wherein each cladding body has an inner surface defining a coolant channel, wherein the lower core plate includes a plurality of openings extending from a first side of the lower core plate to a second side of the lower core plate, and wherein the first portion of each cladding body extends into a different one of the plurality of openings in the lower core plate;
sliding each of a plurality of fuel composition bodies over an outer surface of a different one of the plurality of cladding bodies, wherein each fuel composition body has the shape of an annular cylinder, and wherein an inner surface of the annular cylinder of the fuel composition body is oriented toward the outer surface of the cladding body;
sliding each of the moderator bodies over an outer surface of a different one of a plurality of fuel composition bodies, wherein, in a cross-section, each moderator body has a periphery having a regular polygonal shape and an inner opening, and wherein a surface of the inner opening of the moderator body is oriented toward an outer surface of the annular cylinder of the fuel composition body; and
joining a second portion of the cladding body to an upper core plate, wherein the upper core plate includes a plurality of openings extending from a first side of the upper core plate to a second side of the upper core plate and wherein the coolant channel of the cladding body extends into one of the plurality of openings in the upper core plate,
wherein the assembled cladding body, fuel composition body that is radially outward of the cladding body, and moderator composition body that is radially outward of the fuel composition body define a fuel element structure,
wherein, in each fuel element structure, the cladding body includes a first portion that extends axially past a first axial end of the fuel composition body and a second portion that extends axially past a second axial end of the fuel composition body,
wherein an outer surface of a moderator body of a first fuel element structure abuts an outer surface of a moderator body of a plurality of nearest neighbor fuel element structures, and
wherein a portion of the upper core plate, a portion of the lower core plate, and the cladding body of each fuel element structure form a first portion of a containment structure for the nuclear propulsion reactor.

28. The method of manufacturing a nuclear propulsion fission reactor structure according to claim 27, wherein forming the plurality of cladding bodies includes extruding the cladding body in the form of a seamless tube.

29. The method of manufacturing a nuclear propulsion fission reactor structure according to claim 27, wherein joining the first portion of each of the cladding bodies to the lower core plate includes welding.

30. The method of manufacturing a nuclear propulsion fission reactor structure according to claim 27, wherein forming the plurality of fuel composition bodies includes a fuel compaction technique or an additive manufacturing technique.

31. The method of manufacturing a nuclear propulsion fission reactor structure according to claim 27, further comprising affixing the fuel composition body to the cladding.

32. The method of manufacturing a nuclear propulsion fission reactor structure according to claim 31, wherein affixing the fuel composition body to the cladding includes press fitting or hot isostatic pressing.

33. The method of manufacturing a nuclear propulsion fission reactor structure according to claim 27, wherein joining the second portion of each of the cladding bodies to the upper core plate includes welding.

34. The method of manufacturing a nuclear propulsion fission reactor structure according to claim 27, further comprising positioning a reflector about an outer surface of assembled fuel element structures and mating an inner surface of the reflector to an outer surface of the assembled fuel element structures with a core former.

35. The method of manufacturing a nuclear propulsion fission reactor structure according to claim 34, wherein the inner surface of the reflector forms a second portion of the containment structure for the nuclear propulsion reactor.

36. The method of manufacturing a nuclear propulsion fission reactor structure according to claim 27, the method further comprising one or more of:
  forming the plurality of cladding bodies;
  forming the plurality of fuel composition bodies; and
  forming the plurality of moderator bodies.

37. The nuclear propulsion fission reactor structure according to claim 1, wherein the fuel composition body has a shape of an annulus having an inner surface defining an opening and an outer surface, and
  wherein the coolant channel is radially inward of the inner surface and the moderator composition body is radially outward of the outer surface.

* * * * *